March 28, 1950 R. V. McKAY 2,502,166
GAUGE AND METHOD FOR MOUNTING AND SECURING DOORS
Filed June 4, 1948 2 Sheets-Sheet 1

INVENTOR.
Robert V. McKay
BY
ATTORNEYS.

March 28, 1950     R. V. McKAY     2,502,166
GAUGE AND METHOD FOR MOUNTING AND SECURING DOORS
Filed June 4, 1948     2 Sheets-Sheet 2
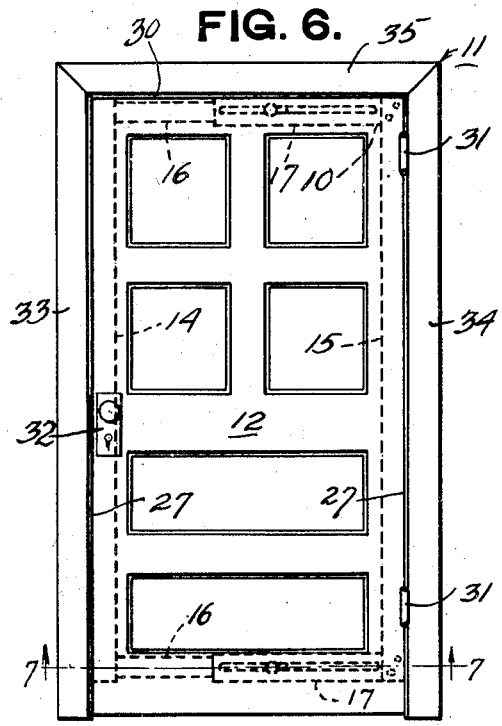
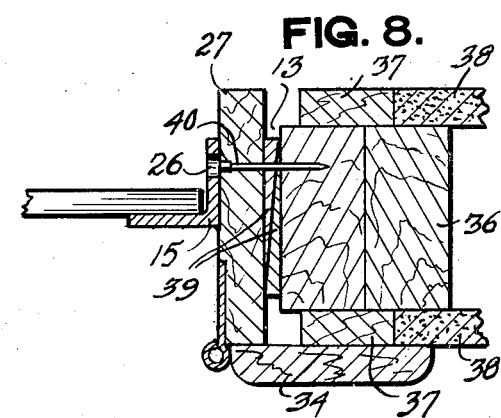
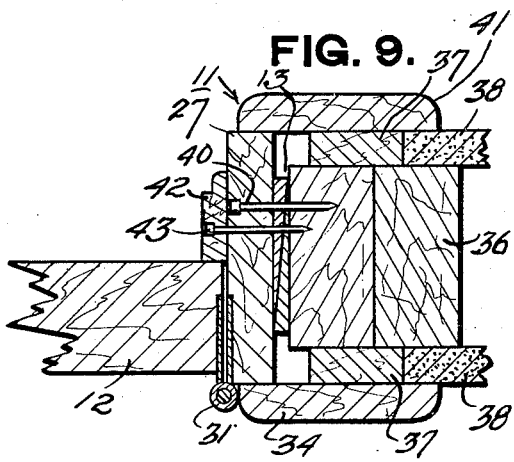
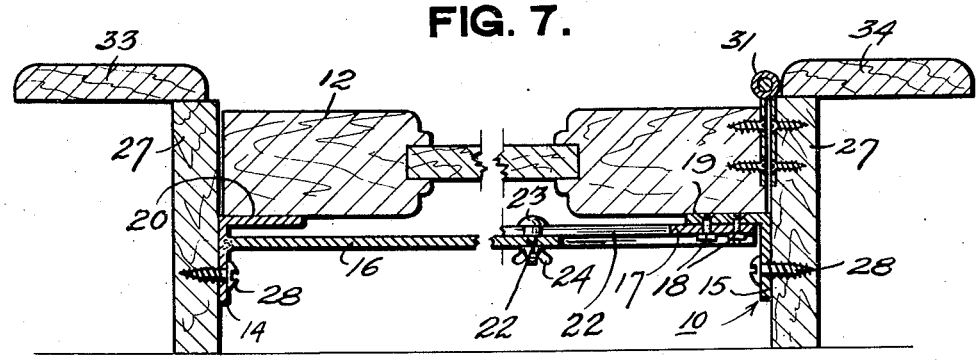
INVENTOR.
Robert V. McKay
BY *Lancaster, Allen & Rommel*
ATTORNEYS.

Patented Mar. 28, 1950

2,502,166

UNITED STATES PATENT OFFICE 2,502,166

GAUGE AND METHOD FOR MOUNTING AND SECURING DOORS

Robert V. McKay, Detroit, Mich.

Application June 4, 1948, Serial No. 31,158

4 Claims. (Cl. 33—194)

1

This invention relates to gauges for trimming and hanging doors and the like.

The principal object of the invention is to provide a gauge which may be used by joiners to accurately fit and place trim about the rough frames of openings erected by carpenters and to accurately fit and place doors and casement windows with respect to such trim.

Another object of my invention is to provide an adjustable gauge for the above purpose which is adaptable for various sizes of rough frames whereby the trims and closures may be accurately assembled and positioned in wall openings with a material saving of time and expense.

Another object of the invention is to provide such a gauge which, during the assembling of the casing and closure, will function as the stop upon which the closure door, or window particularly of the casement type, may rest on the bench during the fitting of such closure with its hinges and locks in the casement frame. The invention provides a guide for use in securing the frame in a wall opening and is removable therefrom after the frame is secured in place in the wall opening.

Further objects and details of the invention will appear in the following detailed description taken in conjunction with the accompanying drawings forming a part of this specification and illustrating a highly practical form of my invention.

In the drawings:

Figs. 4, 5 and 6 illustrate successive stages of construction of a door casing and the mounting of a door therein employing the gauge in accordance with my invention.

Figs. 7, 8 and 9 are sectional and fragmentary sectional views taken substantially on line 7—7 of Fig. 6 illustrating the mounted door in its casing and further steps in the mounting of the casing and door in a wall opening employing the gauge in accordance with my invention.

Figure 1:
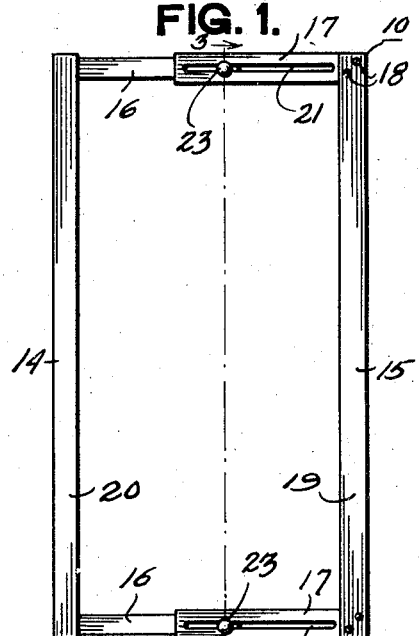
Fig. 1 is a front face view of a gauge in accordance with my invention.

Referring to the drawings I have illustrated a gauge 10 for use in constructing a wooden casing 11 and mounting a door 12 therein, and subsequently mounting the same in an opening in a wall 13 (one side only being shown in the fragmentary sectional views Figs. 8 and 9) with a high degree of accuracy and a great saving of time

2 with a higher degree of precision in fit and neatness of the finished fabrication. While the gauge is illustrated as applicable to doors and their casings it is also applicable in the same general manner to casement windows and the like.

Figure 2:
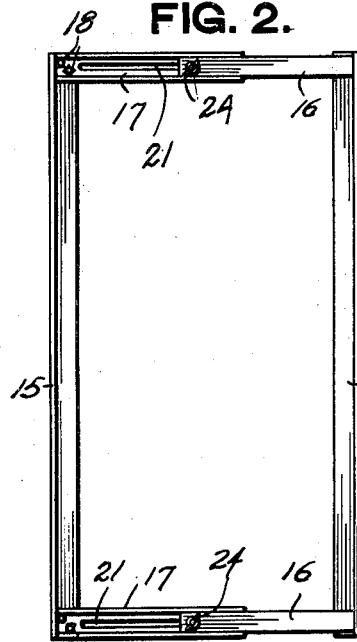
Fig. 2 is a back face view thereof.
Figure 3:
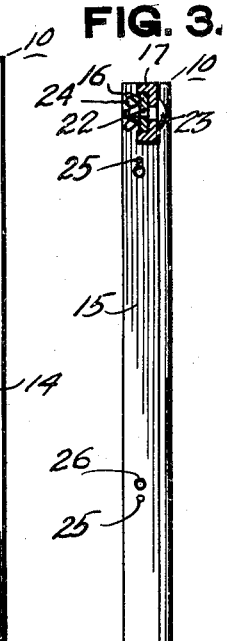
Fig. 3 is a sectional view thereof taken on line 3—3 of Fig. 1 on a larger scale.

Gauge 10, as best shown in Figs. 1, 2 and 3, for door frame construction work, comprises a pair of longitudinal side members 14 and 15 preferably of rolled angle section formation of iron or other preferably lighter metal such as aluminum or the like. These side members for fabricating a door casing are of a length somewhat shorter than the height of the door as it is not necessary that they should extend the full length of the closure height. Side angle member 14 has welded or otherwise secured to one of its sides, rail sections 16, of a length shorter than the narrowest door casing with which the gauge is to be used, adjacent to its ends so as to extend laterally therefrom at right angles and in spaced parallel relation to its other angle side as best shown in Fig. 7. Side angle member 15 has laterally extending rolled channel rail sections 17 removably secured to it by bolts 18 or the like. The heads of the bolts are preferably countersunk so as not to extend beyond the outer face surface of the side 19 of the side angle member 15. Sides 19 of this member 15 and 20 of member 14 are to provide a working plane without any projections of the gauge therebeyond for supporting the closure door 12 to be mounted in casing 11. The other sides of the side angle members are substantially the width of the usual door stop strip or bead employed in a door casing. These rail members 17 are mounted on side angle member 15 corresponding with and adapted to receive the rail sections 16 and are provided with longitudinal slots 21 and rail sections 16 with bolt holes 22 for receiving bolts 23, wing nuts 24 thereon being adapted to secure the rail members in any desired longitudinally adjusted position with respect to each other whereby the gauge may be adjusted to the required width for the door casing.

For wider doors than the full adjustment permitted by companion rail members 16 and 17, members 17 are removable and may be replaced by longer rail members to provide for the fabrication of casings of any desired opening width, such longer adjustable rails being the same general construction as rails 17 are not shown in the drawings but are provided in sets for the gauge.

As shown in Fig. 3 the outer sides of side angle members 14 and 15 are each provided with a plurality of pairs of spaced holes, the smaller holes 25 for receiving wood screws for securing the gauge to the door casing jambs and the larger holes 26 for accommodating nail sets for afterwards securing the jambs in the rough framing by nails or the like.

Figure 4:
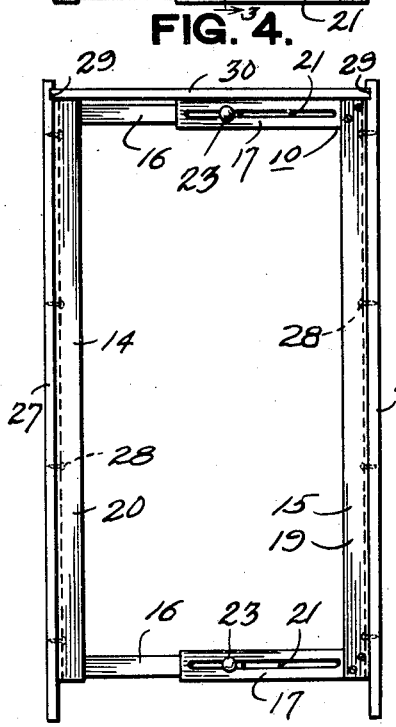
Figure 5:
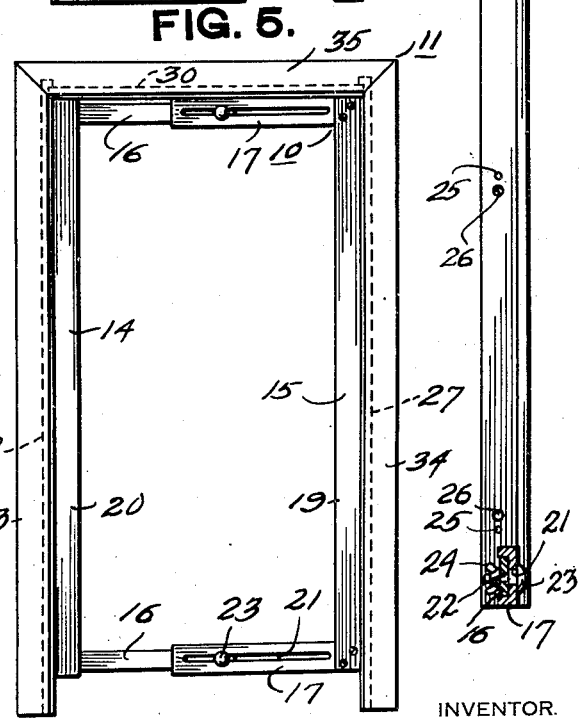

In operation the gauge 10 is first placed on a work bench with the front face (Fig. 1) uppermost and the gauge is adjusted to substantially the width of the door (the width of the door plus tolerances). The two jambs 27 of casing 11 are cut to length and secured to the side faces of the side angle members 14 and 15 of the gauge by means of screws 28 with these outer faces of the gauge in the position along the jambs in accordance with the thickness of door 12 which will afterwards be occupied by the door stop bead or stop strip. Rabbets 29 of the jambs, just beyond the ends of the side members of the gauge as shown in Figs. 4 and 7 are provided in the jambs before they are secured to the gauge. The header 30 is then cut to proper length and driven into place, its ends being received in the rabbets 29 of the jambs. Door 12 is then fitted between the casing jambs and such hardware as hinges 31 and lock 32 are fitted in place, the door resting on gauge 10 as shown in Figs. 6 and 7 to facilitate proper positioning of the hinges and lock. After the jambs and header are accurately secured in place on the gauge, trim strips 33, 34 and 35 may be secured by nails or the like, to the jambs and header as shown in Figs. 5, 6 and 7. This is preferably accomplished after securing the door hinges to the door and jamb, and even after the latch and lock of the door together with the keeper have been placed.

With the jambs and header mounted on gauge 10 and door 12 and outer face trim strips 33, 34 and 35 thus accurately assembled on the bench, the pintles of hinges 31 are removed and door 12 may be disconnected from the framing and temporarily set to one side. The gauge 10 with the attached casing jambs, header and one side of the trim may then be placed in the roughed in framing 36 of the opening in wall 13 on which ground strips 37 and plaster or other wallboard 38 of the wall are secured. Suitable wedges 39 are then placed between the rough framing 36 and the jambs as shown in Fig. 8 and the jambs are secured to this rough framing by driving and setting nails 40 through the holes 26 in the gauge side members provided for that purpose.

The trim strips 41 may then be cut and secured in place on the rear face of frame jambs 27, nailed or otherwise secured to the jambs and plaster ground strips 37 as shown in Fig. 9. Gauge 10 may then be removed and stop beads 42 secured to jambs 27 by nails 43 or the like thus covering the holes made in the jambs by screws 28 that secured the jambs to the gauge. Subsequently the door can be replaced and the pintles of hinges 31 run through the barrels of the hinges and the fabrication of the door casing and door in the wall opening is completed.

Having described in detail a highly satisfactory gauge for assembling a door casing, door and hardware and the manner of mounting and securing a door and its casing in a wall opening, it is obvious that various changes may be made in the construction of the gauge and manner of using the same within the spirit and scope of my invention, as set forth in the following claims.

I claim:

1. The method of securing a closure casement and closure with a gauge having parallel side members spaced corresponding with the width of the closure member which consists in securing casement jamb members along the sides of the gauge with the gauge in the position of the closure stop, securing the casement header to the jamb members, mounting the closure in the jamb members with hinges, securing said casement frame members in the rough frame of the wall opening and removing the gauge and replacing it with stop bead strips in the place formerly occupied by the gauge side members.

2. The method of securing a closure casement and closure with a gauge having parallel side members spaced corresponding with the width of the closure member which consists in securing casement jamb members along the sides of the gauge with the gauge in the position of the closure stop, securing the casement header to the jamb members, mounting the closure in the jamb members with hinges, securing trim strips on one side of said jambs and header, removing the door by detaching the hinge pintles, securing the said casement frame members in the rough frame of the wall opening with said trim strips against one face of the wall, removing the gauge and replacing it with stop bead strips in the place formerly occupied by the gauge side members, replacing the door, and securing the trim strips to the jambs and header on the opposite side face of the wall.

3. A gauge for constructing casement frames, mounting casement closures in the frames and securing said parts in a wall opening, comprising a pair of longitudinal side members having first flat outer side faces for engagement with the inner faces of the side frame members of the casement frame and laterally extending sets of openings therethrough for the reception of fastening members for securing said longitudinal side members to the side frame members along the position to be occupied by the stop strip for the casement frame closure member, said longitudinal side members having second flat surfaces at right angles to said first flat outer side surfaces thereof, in the plane to be occupied by the casement closure member and upon which the closure member may be supported for securing hinge members, locks and the like of the closure member to the side frame members of the casement frame in proper position prior to securing the casement frame in a wall opening, and inwardly extending rails on the inner side of each of said longitudinal side members back of said second flat surfaces so as to be out of the way of the casement closure member in closed position in the casement frame, for cooperation with each other for securing the longitudinal side members at the required distance apart in accordance with the width of the casement closure to be mounted in the casement frame.

4. A gauge for constructing casement frames, mounting casement closures in the frames and securing said parts in a wall opening, comprising a pair of longitudinal side members having first flat outer side faces for engagement with the inner faces of the side frame members of the casement frame and laterally extending sets of openings therethrough for the reception of fastening members for securing said longitudinal side members to the side frame members along the position to be occupied by the stop strip for the casement frame closure member, said longitudinal side members each also having a second set of laterally extending openings therethrough, through which openings casing frame securing elements may be passed while said longitudinal side members are secured in position on the side frame members of the casement frame, said longitudinal side members having second flat surfaces at right angles to said first flat outer side surfaces thereof, in the plane to be occupied by the casement closure member and upon which the closure member may be supported for securing hinge members, locks and the like of the closure member to the side frame members of the casement frame in proper position prior to securing the casement frame in a wall opening, and means for securing said longitudinal side members at the required distance apart in accordance with the width of the casement closure to be mounted in the casement frame.

ROBERT V. McKAY.

REFERENCES CITED

The following references are of record in the file of this patent:

UNITED STATES PATENTS

| Number | Name | Date |
| --- | --- | --- |
| 481,245 | Ritterbeck | Aug. 23, 1892 |
| 880,252 | Tennent | Feb. 25, 1908 |
| 1,115,030 | Smith | Oct. 27, 1914 |
| 1,192,418 | Hallberg | July 25, 1916 |
| 1,946,961 | Blade | Feb. 13, 1934 |